Patented Dec. 3, 1940

2,223,426

UNITED STATES PATENT OFFICE 2,223,426

SOURCES OF LIGHT COMPRISING AN ELECTRIC DISCHARGE DEVICE AND LUMINESCENT MATERIAL ADAPTED TO BE EXCITED BY THE DISCHARGE THEREIN

Alfred Hamilton McKeag, Wembley, and John Turton Randall, Northfield, Birmingham, England, assignors to General Electric Company, a corporation of New York No Drawing. Application October 20, 1938, Serial No. 236,120. In Great Britain October 20, 1937

4 Claims. (Cl. 250—81)

This invention relates to sources of light of the type comprising (1) an envelope containing electrodes and a gaseous medium, whereby a discharge is adapted to pass through the said medium and to excite the spectrum of at least one component of it, and (2) luminescent material, having magnesium tungstate and/or zinc tungstate as a principal constituent, located, either within the envelope or exposed to radiation passing through the envelope, so as to be excited to luminescence by the said discharge.

These two tungstates (which are known to be very similar in their luminescent properties) are almost perfectly white when they are pure, but they are apt to be discoloured and thereby to lose some of their efficiency as luminescent materials. The loss is doubtless due, at least in part, to absorption of the incident primary (ultra-violet) radiation and/or of the secondary (luminescent) light emitted.

The discoloration may arise at different stages in the preparation and use of the material. The tungstates prepared by precipitation are usually white; but those prepared by heating a mixture of magnesium (or zinc) oxide with tungstic oxide may be discoloured, if great care is not exercised. A more important source of discoloration is the heating of the material during the evacuation of an envelope in which it is contained; the residual gases during the evacuation are reducing, and it is probable that the discoloration (which then has a characteristic bluish tinge) is due to the formation of an oxide of tungsten containing less oxygen than $WO_3$.

Discoloration is also apt to appear during the early life of the lamp (for example, after 50 hours operation), especially if the medium filling the envelope contains mercury. Discoloration arising in this way has a different appearance from that arising from heating the material; its cause is less easily suggested; but there is some evidence that it arises, in part at least, from the presence of finely divided mercury adhering to the surface of the tungstate.

We have discovered that discoloration arising in any of these ways can be greatly reduced or eliminated by associating with the tungstate excess of magnesium oxide and/or zinc oxide. It does not appear essential to associate excess magnesium (and not zinc) oxide with magnesium tungstate and vice versa; but we are aware of no advantage in associating with the tungstate a basic oxide other than that of the tungstate.

According to the invention in a source of light of the type specified the said luminescent material contains an appreciable excess of magnesium and/or zinc oxide, intimately mixed with the said tungstate, and is substantially white. Here and hereinafter an appreciable excess implies that, if $a$ mols. of $WO_3$ are present in the luminescent material, there must be present $(1+x)$ $a$ mols. of $(MgO+ZnO)$, where $x$ is not less than 0.05. The excess oxide will then be about $15x\%$ by weight of the tungstate if the oxide is MgO, and about $24x\%$ if it is ZnO.

As might be expected, the power of the excess oxide to prevent discoloration increases with its amount; the amount required varies with the method of preparation and use of the material; thus an amount of oxide sufficient to prevent discoloration arising in the first two of the aforesaid ways will not always prevent discoloration arising in the third. On the other hand the addition of large quantities of oxide necessarily produces some decrease of the luminescent efficiency of the material by dilution. The decrease is surprisingly small, and even if $x$ is 1.3 there may be no serious loss. Nevertheless it is generally desirable not to increase the amount of oxide greatly beyond that required to prevent discoloration.

Relatively small quantities of oxide, say $x$ not greater than 0.1, are conveniently introduced in the preparation of the luminescent tungstate. If a larger quantity is to be introduced, some at least of it is preferably introduced after preparation, by mixing the luminescent tungstate intimately with the oxide.

Two methods of preparing luminescent material for use according to the invention will now be described by way of example. In the first method the amount of excess oxide is relatively small; in the second it is relatively large.

In the first method magnesium (or zinc) oxide is mixed with tungstic oxide in the proportion of 11 molecules of MgO (or ZnO) to 10 molecules of $WO_3$; the mixture is heated in an oxidizing atmosphere at about 1150 C. for one hour. It is then ground and sieved in the usual way, and is then ready for use. $x$ is 1/10.

In the second method material produced by the first method is mixed intimately when dry with 0.9 mol. of pure magnesium oxide, and the mixture heated to 400° C. for half an hour. $x$ is then 1.

Having now particularly described and ascertained the nature of our said invention and in what manner the same is to be performed, we declare that what we claim is:

1. A luminescent material for gaseous electric discharge lamps comprising essentially a tungstate of one or both of the metals selected from the group consisting of magnesium and zinc, said tungstate containing an appreciable excess of the oxide of one or both of the said metals magnesium and zinc in an amount sufficient to appreciably minimize discoloration of the tungstate during its preparation or its use in a discharge device.

2. A luminescent material as set forth in claim 1 wherein the excess of oxide is present in an amount equal to $(1+x)a$ mols. where $a$ represents the mols. of $WO_3$ present in the luminescent material and $x$ is not less than 0.05.

3. A luminescent material for gaseous electric discharge lamps comprising essentially magnesium tungstate containing an excess of magnesium oxide in an amount equal to about $15x$ per cent by weight of the tungstate where $x$ is not less than 0.05.

4. A luminescent material for gaseous electric discharge lamps comprising essentially zinc tungstate containing an excess of zinc oxide in an amount equal to about $24x$ per cent by weight of the tungstate where $x$ is not less than 0.05.

ALFRED HAMILTON McKEAG.
JOHN TURTON RANDALL.